United States Patent Office 2,811,500
Patented Oct. 29, 1957

2,811,500

POLYMERIZABLE DIALLYL PHTHALATE COMPOSITIONS CONTAINING, AS A FILLER, KAOLIN COATED WITH A THERMOSETTING AMINE FORMALDEHYDE RESIN

David E. Cordier, Toledo, Ohio, assignor, by mesne assignments, to Allied Chemical & Dye Corporation, New York, N. Y., a corporation of New York No Drawing. Application February 20, 1953,
Serial No. 338,141

4 Claims. (Cl. 260—39)

The invention relates to the production of polymerizable polyallyl ester compositions which upon polymerization have improved water resistance and electrical properties.

In a filled polyallyl ester composition, such as a molding composition, the filler is an extremely important ingredient. It is difficult to prepare a filled polyallyl ester composition that has sufficient viscosity to permit it to be molded in commercial equipment. Filled polyallyl ester compositions tend to be too fluid to be handled in such equipment; filled compositions that are too fluid have a tendency to squirt out of the mold. Various precautions must be taken in the preparation of a filled polyallyl ester composition in order to avoid excessive fluidity. Among the factors that must be regulated carefully to provide satisfactory molding properties are the nature and the amount of the filler.

The filler in such a composition also has a very important effect upon the strength of articles molded from the composition and upon the resistance of such articles to moisture.

Because of the difficulty of preparing a filled polyallyl ester composition which has satisfactory moldability and produces molded articles of satisfactory strength, the selection of a satisfactory filler for such a composition is a difficult problem. Certain fillers which tend to improve the water resistance of the molded articles also tend to cause serious impairment of the strength of such articles. Polyallyl ester compositions are of great potential value for the production of water resistant articles, but this potential value has not been realized heretofore because the fillers heretofore used in such compositions have prevented the attainment of the desired water resistance in the molded articles.

The principal object of the invention is the production of a filled polyallyl ester composition of satisfactory moldability that produces molded articles having not only satisfactory strength but also excellent water resistance and electrical properties.

More specific objects and advantages are apparent from the description, which illustrates and discloses but is not intended to limit the invention.

The present invention is based upon the discovery that molded articles having very satisfactory strength and having excellent water resistance and electrical properties can be obtained from a composition which has satisfactory moldability and comprises (a), as a binder, a polymerizable polyallyl ester of a polybasic acid, and (b), as a filler, kaolin particles coated with a thermosetting reaction product of formaldehyde and a substance whose molecule has a plurality of $NH_2$ groups each connected to a carbon atom contained in a heterocyclic ring, the ring consisting of from five to six carbon and nitrogen atoms of which not more than three are nitrogen atoms, and the carbon atom being connected by a double bond to an intracyclic nitrogen atom. The term "polybasic acid" as used herein designates an acid having more than one acid radical.

The unique and outstanding results obtained in the practice of the present invention have been demonstrated as follows:

A molding composition of the invention was prepared as follows:

A solution of a partially polymerized polyallyl ester (2800 grams consisting of 50 percent by weight of acetone solvent, and 50 percent by weight of diallyl phthalate of which 95 percent by weight is in the form of a soft, solid, fusible polymer melting in the range from 210 to 220 degrees F.) was mixed, as in a Hobart mixer, with a catalyst (56 grams of t-butyl perbenzoate), a filler (2600 grams of resin-coated kaolin particles) and a lubricant (80 grams of zinc stearate). (The resin-coated kaolin particles were prepared as follows: A reaction mixture of a heterocyclic polyamine (9 parts of melamine), formalin (17.4 parts) and water (206.6 parts) was heated to 80 degrees C. and held at that temperature for ten minutes, the pH being adjusted to 6.8 to 7.0 with dilute lactic acid as soon as a clear solution was obtained. The resulting resin solution was then cooled to 60 degrees C. before stirring in kaolin (120 parts) to make a relatively thin slurry. This slurry was then spray-dried at an air inlet temperature of 500 to 600 degrees F. and an air outlet temperature of about 275 degrees F.) The mixing was continued until a homogeneous material was obtained, which material was then dried at 140 degrees F. for three hours to remove the excess of acetone solvent. The material was then milled on differential rolls for about ten minutes. The resulting sheet was cooled and was granulated in a high speed cutter.

For the sake of comparison, control compositions were prepared as follows:

Control composition 1 was prepared by the procedure described above for the preparation of a composition of the invention (hereinafter referred to as composition A), except that ordinary kaolin was used in place of the resin-coated kaolin particles.

Control composition 2 was prepared by the procedure described for composition A, except that the filler consisted of cellulose flock (1200 grams) and the proportions of the other ingredients were as follows: 3600 grams of the solution of partially polymerized diallyl phthalate; 72 grams of t-butyl perbenzoate; and 60 grams of zinc stearate.

Control composition 3 was prepared by the procedure described for composition A, except that the filler consisted of chrysotile fibers (2480 grams) and the proportions of the other ingredients were as follows: 3040 grams of the solution of partially polymerized diallyl phthalate; 60.8 grams of t-butyl perbenzoate; and 80 grams of zinc stearate.

The composition of the invention (A) and the control compositions were molded (under one to four tons of pressure per square inch of projected area in a mold heated with steam at 75 lbs. gauge pressure) into disks which were cured for approximately two to five minutes at 310 degrees F. and were then tested by the following procedures:

The disks were immersed in water, and the water absorption was measured as the gain in weight (in grams) during immersion. (Water resistance varies with the amount of moisture that an article is capable of absorbing, because the degree of deterioration upon exposure to moisture varies with the amount of moisture absorbed.) In Table 1 below, the water absorption is given for tests in which test pieces made from molding composition A (column 2) and control molding compositions 1, 2 and 3 (columns 3, 4 and 5) were immersed in boiling water for one hour (line 1), and in cold water for 24 hours (line 2) or 48 hours (line 3) or 7 days (line 4).

Insulation resistance is one of the most important qualifications of a synthetic resin for use in electrical applications. Insulation resistance may be defined as the resistance offered to the flow of a current when a voltage is impressed between two electrodes embedded in a hardened composition at a standard distance. In an accelerated test used to determine the retention of insulation resistance by compositions embodying the invention, the polymerized compositions are exposed to high relative humidities and high temperatures for prolonged periods of time to promote the breakdown of their insulation resistance. The insulation resistance is then determined by measuring the resistance (in megohms) offered to the flow of a current when a voltage is impressed between two electrodes so embedded in molded articles that there is a distance of 1¼ inches between the centers of the electrodes. (The initial insulation resistance of each sample is over one million megohms.) The results of the insulation resistance tests after exposure of articles molded from composition A and from the control compositions to a temperature of 160 degrees F. and a relative humidity of 95 percent for various lengths of time are given in Table 1 below (line 5). (The erratic results are due largely to the extreme difficulty of measuring high resistance under conditions prevailing in the humidity test chamber.)

Table 1 also includes the results of strength tests on bars (6" x ½" x ¼") molded from composition A and from the control compositions. The strength tests employed are standard tests for plastic materials and are considered to be capable of showing generally the strength characteristics that are important in industrial plastic materials. The flexural and compressive strengths (lines 6 and 7) and the flexural moduli (line 8) of the molded bars are shown in Table 1.

TABLE 1

| | Composition | | | |
|---|---|---|---|---|
| | A | Control 1 | Control 2 | Control 3 |
| 1. Boiling water absorption 1 hr | .010 | .030 | .070 | .025 |
| 2. Cold water absorption 24 hrs | .005 | .010 | .055 | .010 |
| 3. Cold water absorption 48 hrs | .005 | .015 | .08 | .015 |
| 4. Cold water absorption 7 days | .015 | .040 | .175 | .035 |
| 5. Insulation Resistance (meg.): | | | | |
| 7 days | 105,000 | 151 | 82 | 12 |
| 14 days | 119,000 | 160 | 12 | 9 |
| 21 days | 109,000 | 155 | 30 | 8 |
| 28 days | 99,000 | 155 | 28 | 7 |
| 6. Flexural (p. s. i.) | 5,590 | 3,940 | 6,690 | 7,380 |
| 7. Compressive (p. s. i.) | 22,100 | 15,200 | 25,100 | 22,800 |
| 8. *Flexural Modulus* $10^6$ | 1.30 | 1.32 | .94 | 1.52 |

As the results in Table 1 indicate, the resistance to hydrolysis of articles molded from a polymerizable polyallyl ester composition of the invention (which comprises resin-coated kaolin particles as a filler) is greater than the resistance to hydrolysis of articles molded from a similar composition which, however, comprises ordinary kaolin or asbestos or cellulose as a filler. In fact, the resistance to hydrolysis of articles molded from a composition of the invention is so superior that such articles show much better retention of electrical properties after exposure to high humidity than articles molded from a similar composition which does not comprise resin-coated kaolin particles as a filler. At the same time, the use of resin-coated kaolin particles as a filler in a polymerizable polyallyl ester composition produces molded articles of very satisfactory strength, as is evident from the strength test results in Table 1.

*Binder*

The binder in a composition of the invention comprises a polymerizable polyallyl ester. Such a substance may be an ester or mixed ester of two alcohol molecules, each consisting of a molecule of allyl, methallyl or beta-chloroallyl alcohol, with a molecule of any of the dibasic acids listed in Table 2 below.

TABLE 2

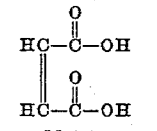
Maleic

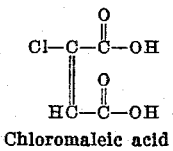
Chloromaleic acid

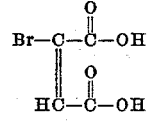
Bromomaleic acid

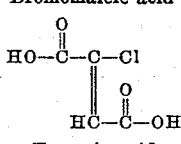
Fumaric acid

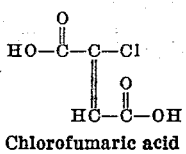
Chlorofumaric acid

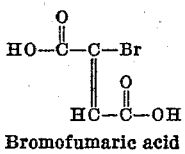
Bromofumaric acid

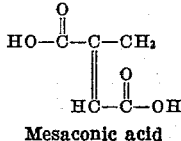
Mesaconic acid

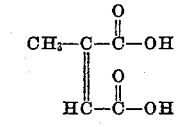
Citraconic acid

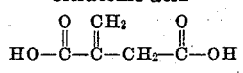
Itaconic acid

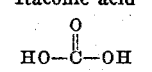
Carbonic acid

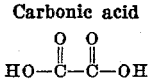
Oxalic acid

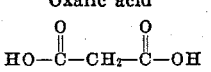
Malonic acid

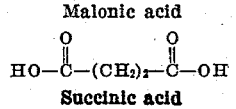
Succinic acid

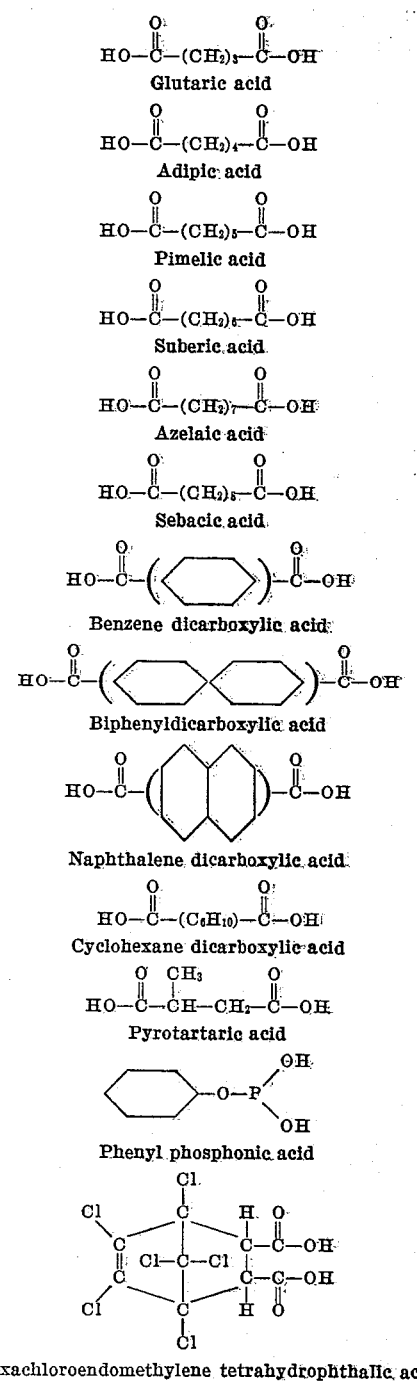

Hexachloroendomethylene tetrahydrophthalic acid

"Benzene dicarboxylic acid" in the foregoing table includes o-, m-, and p-phthalic acid. Similarly, the enclosure of the biphenyl ring and the naphthalene ring in parentheses in the above table is intended to indicate that any of the various position isomers may be used. In the case of cyclohexane dicarboxylic acids, any of the various position isomers may be used either in cis or in trans relationship.

Other dibasic acids whose allyl esters may be used include mono-, di-, tri- and tetrachloro-substituted o-phthalic acids, isophthalic acids, and terephthalic acids. Examples of chloro-substituted phthalic acids include: 4-chlorophthalic acid, 3-chloro-phthalic acid, 3,6-dichlorophthalic acid, 3,4,6-trichlorophthalic acid, tetrachlorophthalic acid, 4-chloroisophthalic acid, 5-chloroisophthalic acid, tetrachloroisophthalic acid and tetrachloroterephthalic acid.

The polymerizable polyallyl ester may also be an ester or mixed ester of a molecule of a tribasic or other poly-basic organic or inorganic acid with three or more allyl, methallyl, or beta-chloroallyl alcohol molecules. Such substances include triallyl tricarballylate, triallyl aconitate, triallyl citrate, triallyl phosphate, trimethallyl phosphate, triallyl cyanurate, and tetrallyl silicate.

The polymerizable polyallyl ester may also be an ester or mixed ester of (a) a substance having the general formula: R—O—D—OH in which R is allyl, methallyl, or betachloroallyl and D is the divalent acid radical of any of the dibasic acids listed in Table 2 with (b) a substance having the general formula

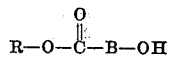

in which B is methylene, methyl methylene, or any phenylene group. The latter substance may also consist of a compound having the general formula

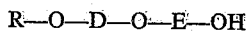

in which E is the divalent radical to which two hydroxy groups are attached, in any of the dihydroxy compounds listed in Table 3 below.

TABLE 3

HO—CH₂—CH₂—OH
Ethylene glycol

OH
|
CH₃—CH—CH₂—CH
Propylene glycol

OH
|
HO—CH₂—CH—CH₂—CH₃
1,2-butylene glycol

OH  OH
|   |
CH₃—CH—CH—CH₃
2,3-butylene glycol

HO—(CH₂)₃—OH
Tri-methylene glycol

HO—(CH₂)₄—OH
Tetra-methylene glycol

HO—(CH₂)₅—OH
Penta-methylene glycol

HO—(CH₂)₆—OH
Hexa-methylene glycol

HO—(CH₂)₇—OH
Hepta-methylene glycol

HO—(CH₂)₈—OH
Octa-methylene glycol

HO—CH₂—CH₂—O—CH₂—CH₂—OH
Diethylene glycol

HO—(CH₂—CH₂—O)₂—CH₂—CH₂—OH
Triethylene glycol

HO—(CH₂—CH₂—O)₃—CH₂—CH₂—OH
Tetraethylene glycol

o-, m- or p-dihydroxy benzene

Such a polyallyl ester thus has the general formula

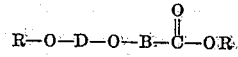

or

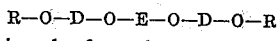

Substances having the formula

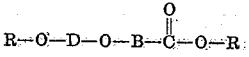

include the diallyl ester of lacto-carbonate and the diallyl ester of hydroxyaceto-carbonate. Such polyallyl esters may be prepared by reacting (1) one molecule of an ester of an allyl alcohol (i. e., allyl alcohol, methallyl alcohol or beta-chloroallyl alcohol) with a mono-basic hydroxy-substituted, chloro-substituted or bromo-substituted acid, such as glycolic acid, chloracetic acid, lactic acid, alpha-bromo propionic acid or hydroxy benzoic acid (e. g., allyl lactate), with (2) one molecule of a half ester of one of the dibasic acids listed in Table 2 with an allyl alcohol.

Polyallyl esters having the general formula

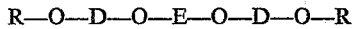

include: diallyl ethylene glycol dioxalate, diallyl ethylene glycol dicarbonate, diallyl diethyene glycol dicarbonate, diallyl trimethylene glycol dicarbonate, diallyl ethylene glycol disuccinate, diallyl ethylene glycol diadipate, diallyl diethylene glycol dimaleate, dimethallyl diethylene glycol dicarbonate, and diallyl diethylene glycol dimalonate.

The polyallyl ester may also consist of an ester of a molecule of any of the dibasic acids listed in Table 2 with two similar molecules (or a mixed ester of a molecule of such a dibasic acid with two dissimilar molecules) each of which is an ester of glycolic, lactic or o-, m- or p-hydroxy benzoic acid with an allyl alcohol. Such a polyallyl ester has the general formula

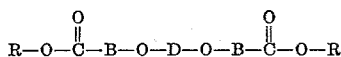

An amino acid such as glycine may be used in place of lactic, glycolic or o-, m- or p-hydroxy benzoic acid, so that the general formula is then

Such polyallyl esters include: carbonyl bis(methallyl lactate), carbonyl bis(allyl lactate), maleyl bis(allyl lactate), fumaryl bis(allyl lactate), succinyl bis(allyl lactate), adipyl bis(allyl lactate), sebacyl bis(allyl lactate), phthalyl bis(allyl actate), fumaryl bis(allyl glycolate), carbonyl bis(allyl glycolate), carbonyl bis(allyl salicylate) and oxalyl bis(allyl glycinate).

The polyallyl ester may also consist of an ether of two similar or dissimilar molecules each consisting of an ester of glycolic, lactic or o-, m- or p-hydroxy benzoic acid with an allyl alcohol. Such a substance has the general formula

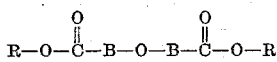

Such substances include the esters of an allyl alcohol with diglycolic acid, with diethyl ether alpha, alpha'-dicarboxylic acid, or with any diphenyl ether dicarboxylic acid in which each of the benzene rings has one carboxyl group attached to it. In the preparation of such a compound, an ether of two hydroxy-substituted acid molecules may first be prepared by reacting the sodium derivatives of glycolic, lactic or any hydroxybenzoic acid with chloracetic or alpha-chloropropionic acid in accordance with the usual procedure for preparing ethers. The product may then be esterified with an allyl alcohol.

The polyallyl ester may also consist of an ether of a molecule of ethylene glycol, propylene glycol, 1,2-butylene glycol, 2,3-butylene glycol or o-, m- or p-dihydroxy benzene with two similar or dissimilar molecules each consisting of an ester of glycolic, lactic or o-, m- or p-hydroxy benzoic acid with an allyl alcohol. Such a substance has the general formula

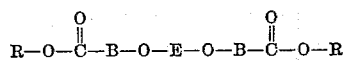

Such a substance may be prepared by reacting one molecule of a sodium derivative of ethylene, propylene or a butylene glycol or of a dihydroxy benzene with two molecules of an ester of chloracetic acid or alpha-chloropropionic acid with an allyl alcohol, in accordance with the usual procedure for preparing ethers.

The polyallyl ester may also consist of an ester of a molecule of silicic acid with four molecules of an ester of glycolic or lactic acid with an allyl alcohol. Such a substance has the general formula

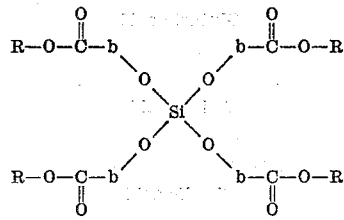

in which b is methylene or methyl methylene and R is allyl, methallyl or beta-chloroallyl. Such compounds include tetra(allyl glycolate) silicate and tetra(allyl lactate) silicate.

The diallyl esters, particularly diallyl phthalate, are preferred in the practice of the invention.

It is most desirable that the polymerizable polyallyl ester that is used as a binder in the practice of the invention be in partially polymerized form. Polyallyl esters are among the few types of monomeric substances whose polymerization by an addition type of polymerization reaction can be arrested while the substance is in a partially polymerized form, and then reactivated later to polymerize the substance to an infusible, insoluble state. In the production of a composition of the invention, it is preferable that a polyallyl ester such as a diallyl ester first be partially polymerized to a soluble addition type of polymer before it is mixed with the other ingredients and then be further polymerized to form the desired type of article (e. g., molded or cast article).

Polyallyl esters may be partially polymerized by effecting the polymerization in the presence of an organic peroxide catalyst such as benzoyl peroxide, di(t-butyl) peroxide or another di(t-alkyl) peroxide by the procedures set forth in United States Patents Nos. 2,433,616 and 2,426,476. The amount of catalyst may range from as little as is required to bring about the reaction in a commercially feasible period of time under practical operating conditions (e. g., 0.01 percent of the polymerizable material) to amounts as great as 10 percent or more. (The terms "percent" and "parts" are used herein to mean percent and parts by weight unless otherwise specified.) The polymerization can be carried out in a continuous or batchwise manner, at atmospheric, superatmospheric or reduced pressures. The polymerization is generally carried out under the influence of heat; ordinarily temperatures from about room temperature to 300 degrees C. may be used. If desired, the polymerization can be carried out in two or more different steps, using different temperatures and/or different catalysts.

The polymerization reaction can be stopped at any point short of completion. It is preferable that the partial polymer of a polyallyl ester that is used as a binder in the practice of the invention be a solid, soluble, fusible, polymerizable polymer that is essentially a B stage resin. Such a partial polymer usually contains a small amount (e. g., 5 to 15 percent) of the corresponding monomer. A lower proportion of monomer (e. g., 5 percent) is preferred. Usually the partially polymerized polyallyl ester is obtained in the form of a 50 percent solution in a common non-reacting solvent such as acetone, which can be mixed with the other ingredients such as fillers, catalysts, etc. before removing the excess of solvent and then advancing the cure of the resin to the desired degree.

Although a polymerizable polyallyl ester (preferably in partially polymerized form) may be the sole component of the binder in a composition of the invention, a polymerizable unsaturated alkyd whose molecule contains a plurality of polymerizably reactive $\Delta^{2,3}$-enedioyl groups may be used in combination with the polymerizable polyallyl ester.

A polymerizable unsaturated alkyd whose molecule contains a plurality of polymerizably reactive $\Delta^{2,3}$-enedioyl groups is prepared by reaction of one or more polyhydric alcohols and one or more polycarboxylic acids having in the molecule at least one polymerizably reactive $\Delta^{2,3}$-enoyl group, having the structure

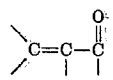

Thus, the polymerizable alkyd is one having polymerizably reactive $\Delta^{2,3}$-enoyl groups contained in dioyl radicals (connecting polyhydric alcohol residues through ester linkages), which dioyl radicals may therefore be defined as $\Delta^{2,3}$-enedioyl radicals. The proportion of polyhydric alcohols having more than two hydroxy groups, such as glycerol or pentaerythritol, and the proportion of polycarboxylic acids having more than two carboxy groups, such as citric acid, preferably is small so that in the production of the alkyd there may be maximum esterification of the hydroxy and carboxy groups without attainment of excessive viscosity (i. e., through cross-linking). For the purpose of the instant invention it is to be understood that the term "unsaturated alkyd" means an alkyd that is polymerizable into an infusible or high melting point resin; so the proportion of unsaturated components should be such that the alkyd contains an average of at least three double bonds per molecule.

Preferably, an alkyd that is used with a polyallyl ester in the binder of a composition of the invention is an ester of a glycol with a dicarboxy alkene having from four to five carbon atoms, in which the carboxy radicals are attached to adjacent carbon atoms (i. e., maleic, fumaric, itaconic, citraconic or mesaconic acid). However, as long as the $\Delta^{2,3}$-enoyl groups are polymerizably reactive, the polycarboxylic acid is not necessarily a hydrocarbon dicarboxylic acid but may contain any radicals (e. g., chloro groups) which do not render the $\Delta^{2,3}$-enoyl groups polymerizably non-reactive. The alkyd may be an ester of a polycarboxylic acid with any glycol, such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane. Also the polyhydric alcohol used may be one whose molecule has two or three free hydroxy groups and consists of an ether of one or two molecules of allyl or methallyl alcohol with one molecule of a polyhydroxy compound such as glycerol, pentaglycerol, pentaerythritol, butanetetrol 1,2,3,4, a trihydroxy normal alkane having from four to five carbon atoms such as butanetriol-1,2,3, or a monoalkyl ether of pentaerythritol or butanetetrol-1,2,3,4, in which the alkyl radical has from one to four carbon atoms and has from one to two hydrogen atoms attached to the same carbon atom as the ether linkage, such as the monomethyl or monoisobutyl ether of pentaerythritol.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid.

The preferred polymerizable unsaturated alkyds are the so-called "linear" alkyds, i. e., those which have very little cross-linking in the alkyd molecules, as evidenced by the fact that such alkyds are soluble in solvents such as acetone. Such alkyds are formed mainly by esterification of a dihydric alcohol and a dibasic acid. Of course, such alkyds are really only "substantially" linear since it is not possible to avoid all cross-linking, at least through the unsaturated bonds in the alkyd molecules. In fact, a linear (or substantially linear) alkyd may be obtained even though in the preparation of such alkyd a small proportion of the dihydric alcohol (e. g., less than about 5 mol percent of the alcohol) is replaced by a polyhydric alcohol containing more than two alcohol radicals, such as glycerol or pentaerythritol, or a small proportion of the dibasic acid (e. g., less than about 5 mol percent of the acid) is replaced by a polybasic acid containing more than two acid radicals, such as citric acid. The preferred linear alkyd for use in the practice of the invention is prepared by carrying out the esterification reaction substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the alkyd during the esterification reaction.

The molecular weight of polymerizable unsaturated alkyds for use in the practice of the invention may vary over a wide range, depending upon the initial reacting ingredients and upon the degree of reaction obtained in the preparation of the alkyds. An alkyd used in the practice of the invention may have a molecular weight ranging from as low as about 500 to as high as about 5000, but ordinarily the molecular weights of preferred polymerizable unsaturated alkyds that may be used in the present invention are in the lower portion of the range; for example, the molecular weight of an alkyd prepared from ethylene glycol, maleic anhydride and small amounts of propylene glycol and phthalic anhydride usually is within the range from about 700 to about 2000.

The number of repeating units in a polymerizable unsaturated alkyd chain, i. e., the number of acid and alcohol residues in the chain-like molecules of the alkyd, may also vary, and alkyds having a high molecular weight have corresponding long chain molecules. In general, in a polymerizable alkyd that may be used in the practice of the invention the number of repeating units in the alkyd chains may range from about 3 to about 25. However, in preferred alkyds used in the present invention there are usually from about 4 to about 15 units in the alkyd chains. Assuming that there is substantially no cross-linking in such polymerizable unsaturated alkyds and that equivalent quantities of, for example, glycol and maleic acid are employed, the number of olefinic unsaturations attached to carbon atoms in the chains of such polymerizable alkyds is, of course, merely the number of acid residues in the alkyd chain. However, if part of the maleic acid is replaced by a saturated acid in the preparation of a polymerizable alkyd, the number of olefinic unsaturations is lower in proportion to the amount of saturated acid employed, even though the number of acid and alcohol units in the chain remains about the same. Other properties of the unsaturated alkyd, such as solubility in various solvents, also may be varied by selecting various reacting ingredients and varying their proportions. The infusibility, hardness and inertness of the product obtained by polymerization of the alkyd may be increased by varying the initial reacting ingredients to increase the average number of olefinic double bonds per molecule of the polymerizable alkyd.

In the preparation of the polymerizable unsaturated alkyd, any of the usual modifiers such as monobasic acids, monohydric alcohols and natural resin acids may be added. The larger the proportions of monobasic acids and monohydric alcohols, the lower is the average number of acid and alcohol residues in the resulting alkyd molecules, and the lower is the viscosity of the alkyd. On the other hand, the more nearly equal the molecular proportions of dibasic acid and dihydric alcohol, the greater is the average number of residues in the resulting alkyd molecules, and the greater is the viscosity. The proportions of ingredients used are those proportions that produce a polymerizable alkyd of the desired viscosity. It is desirable that the proportion of monobasic acids and monohydric alcohols be kept low enough to allow substantial growth of the chain-like molecules during preparation of the unsaturated alkyds, since the presence of a substantial proportion of such monobasic acids and monohydric alcohols retards the chain growth of the alkyds and produces alkyds which may not harden satisfactorily.

The effect of the addition of a small proportion of a monohydric alcohol or a monobasic acid upon the chain growth of an alkyd is dependent to a great extent upon the degree of reaction attained before such a monofunctional acid or alcohol is added. For example, if added at the beginning of the reaction of a dibasic acid with a dihydric alcohol, each molecule of the monofunctional ingredient which reacts with a difunctional acid or alcohol stops the growth of that alkyd chain in one direction so that long chain molecules of the alkyd are difficult to obtain under such conditions. However, if added when the reaction of dibasic acid and dihydric alcohol is almost complete so that fairly long chains have already been built up, the monofunctional ingredient merely esterifies those end groups present in the existing alkyd chains and, therefore, only a small amount may be incorporated in the alkyd without having any deleterious effect upon the final product.

The proportion of monohydric alcohol or monobasic acid used should never be above about 10 mol percent of the acid or alcohol content. Ordinarily the proportion of monohydric alcohol or monobasic acid that may be incorporated in polymerizable unsaturated alkyds for use in molding compositions of the invention is not more than about 5 mol percent of the alcohol or acid content, although alkyds used in casting compositions occasionally may contain a slightly higher proportion of monofunctional ingredients. However, polymerizable unsaturated alkyds which may be used in the practice of the invention usually contain not more than about 2 mol percent of monofunctional acid or alcohol in order that such alkyds may be readily polymerized into infusible or high melting point resins.

The point to which the reaction of the ingredients is carried in the preparation of the polymerizable alkyd is simply that point at which the product has the desired consistency. The consistency or viscosity of the alkyd (prepared by reaction under conditions which prevent any appreciable addition polymerization) varies directly with the average number of acid and alcohol residues in the molecule.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of said catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the alkyd, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated alkyd preferably is carried out in an atmosphere of an inert gas such as carbon dioxide, nitrogen or the like, in order to prevent cross-linking through addition polymerization as well as to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because oxygen causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable alkyd may be prepared by the following procedure:

A three-necked flask is employed in which 5.4 mols of maleic anhydride and 5.4 mols of diethylene glycol are mixed together. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, an alkyd is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to 0.2 percent of the weight of the reacting ingredients; and reaction is continued for 6¼ hours. The resulting alkyd is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable alkyd may be prepared by a procedure that is the same as the first procedure except that 3 instead of 5.4 mols of maleic anhydride and 3.3 instead of 5.4 mols of diethylene glycol are used together with an amount of hydroquinone equal to 0.09 percent of the weight of the reacting ingredients and an amount of p-toluene sulfonic acid equal to 0.18 percent of the weight of the reacting ingredients; and the reaction is carried out for four hours at 200° C. to produce a stiff liquid having an acid number of 10.6.

As a further alternative, the first procedure may be employed except that the amount of maleic anhydride employed is 6 instead of 5.4 mols; the diethylene glycol is replaced by 6 mols of ethylene glycol; a slower stream of carbon dioxide is used; and the ingredients are kept in an oil bath at 220° C. for 5½ hours. The resulting alkyd is a very thick gum having an acid number of 53.

A polymerizable alkyd may also be prepared by a procedure that is the same as in the preceding paragraph except that maleic anhydride is replaced by 5 mols of fumaric acid; the ethylene glycol is replaced by 5 mols of diethylene glycol; and the reaction is continued for 8¼ hours. The resulting alkyd is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increased the length of time required to reach a given acid number at a given temperature. However, the accelerating effect of an acid catalyst upon the esterification is greater when fumaric acid is used. When fumaric acid is employed, other conditions being the same, the resulting alkyd tends to be more viscous and greater care is necessary in order to prevent premature polymerization.

As further variation, the first procedure may be used except that the maleic anhydride is replaced by 1.5 mols of fumaric acid; the amount of diethylene glycol employed is 1.5 instead of 5.4 mols; and the temperature is varied between 200° and 220° C. After the reaction has been continued for 2½ hours, the acid number is 73. After 6 hours, the product is a stiff liquid having an acid number of 41.

A polymerizable alkyd may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; the amount of diethylene glycol used is 3.0 instead of 1.5 mols; 1.5 grams of p-toluene sulfonic acid and 1.3 grams of hydroquinone are added to the initial ingredients; and the reaction is carried out for 3 hours to produce a limpid liquid having an acid number of 26.

A polymerizable alkyl may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 percent of the weight of the reacting ingredients; an amount of hydroquinone equal to 0.09 percent of the weight of the reacting ingredients is added at the start of the reaction; and reaction is carried out at 200° C. for 5 hours to produce a stiff liquid which has an acid number of 10.1.

A molded polyallyl ester composition of the invention, like a molded unsaturated alkyd composition, has excellent dimensional stability characteristics since no volatile products are evolved during the curing reaction. Furthermore, a molded polyallyl ester composition of the invention, like a molded unsaturated alkyd composition, has good electrical characteristics, including arc resistance. A molded polyallyl ester composition of the invention has greater resistance to hydrolysis (and thus better retention of electrical properties under high humidity conditions), in general, than a molded unsaturated alkyd composition. Polyallyl ester molding compositions, in general, also possess greater stability than unsaturated alkyd molding compositions. On the other hand, polyallyl ester molding compositions do not cure as rapidly and, when molded, are slightly weaker in mechanical strength than unsaturated alkyd molding compositions. Thus, upon replacing a portion of the polymerizable polyallyl ester in a composition of the invention with a polymerizable unsaturated alkyd, the properties of the composition will be intermediate between those of an unsaturated alkyd composition and those of a polyallyl ester composition. In general, when the binder in a composition of the invention comprises a polymerizable unsaturated alkyd in addition to the polymerizable polyallyl ester, the proportion of the unsaturated alkyd may be as high as 35 percent of the binder, the polymerizable polyallyl ester being not less than 65 percent of the binder.

*Filler*

The filler in a composition embodying the invention comprises kaolin particles coated with a thermosetting reaction product of formaldehyde and a substance whose molecule has a plurality of NH₂ groups each connected to a carbon atom contained in a heterocyclic ring, the ring consisting of from five to six carbon and nitrogen atoms of which not more than three are nitrogen atoms, and the carbon atom being connected by a double bond to an intracyclic nitrogen atom. For the sake of brevity such a substance is hereinafter referred to as a "heterocyclic polyamine," and kaolin particles (i. e., particles of Georgia clay) which have been coated with a thermosetting reaction product of formaldehyde and a heterocyclic polyamine are referred to as resin-coated kaolin particles.

The term "heterocyclic ring" is used herein to include triazole, diazine and triazine rings. When the heterocyclic ring in a heterocyclic polyamine that is reacted with formaldehyde to form a thermosetting reaction product which is used to coat kaolin particles comprises a triazole ring, the heterocyclic polyamine may be, e. g.: Guanazole,

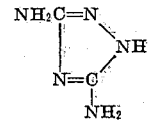

1-phenyl guanazole,

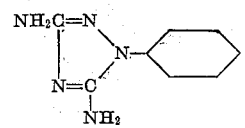

4-aminoguanazole,

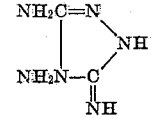

1-carbamyl guanazole,

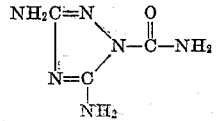

1-guanyl guanazole,

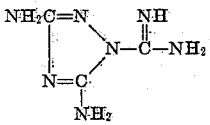

1-acetyl guanazole,

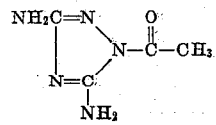

1-benzoyl guanazole,

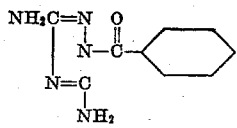

When the heterocyclic ring in a heterocyclic polyamine used in the preparation of resin coated kaolin particles compries a diazine ring, the heterocyclic polyamine may be, e. g., a pyrimidine such as 2,4-diamino-6-hydroxy pyrimidine,

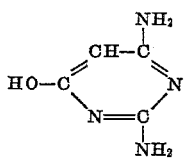

or a quinazoline such as 2,4-diaminoquinazoline,

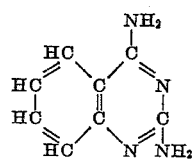

When the heterocyclic ring in a polyamine used in the preparation of resin-coated kaolin particles comprises a triazine ring, the heterocyclic polyamine may be a substance whose molecule contains from one to three triazine rings, and has no functional groups attached to a triazine ring other than the amino groups (such as an amino triazine). The term "functional group" as used herein means any radical in a molecule of such a substance which may enter into undesirable side reactions that interfere with the reaction of formaldehyde with the amino triazine (e. g., an OH group attached to a triazine ring may react with formaldehyde during the production of a thermosetting amino triazine-formaldehyde condensation product). A heterocyclic polyamine that has one triazine ring in its molecule may be (1) a triamino, triazine, e. g. melamine

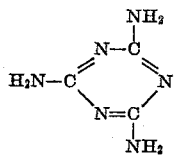

or (2) a diamino triazine (i. e., a monoguanamine) having the general formula

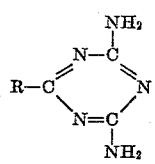

wherein R is a hydrogen atom, a saturated monovalent aliphatic hydrocarbon radical having from 1 to 18 carbon atoms, an aromatic hydrocarbon radical containing 1 benzene nucleus or containing 2 condensed benzene nuclei, a saturated or unsaturated cycloaliphatic hydrocarbon radical, or any of the foregoing radicals containing substituents such as aliphatic, cycloaliphatic, aromatic, alkoxy, aryloxy and acyl radicals. Thus, the monoguanamines used may have varying structures and may be of complex structure so long as they do not contain groups which interfere with the condensation reaction of formaldehyde with the guanamine in the practice of the invention. Such monoguanamines include:

Formoguanamine,

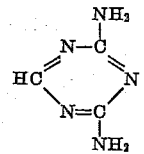

Acetoguanamine,

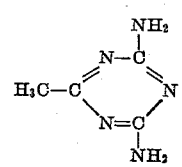

Propioguanamine,

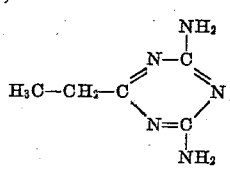

Butyroguanamine,

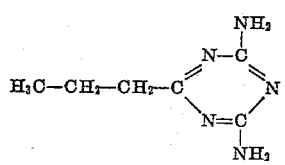

Benzoguanamine,

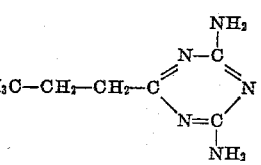

Phenylacetoguanamine,

Delta-cyano-valeroguanamine,

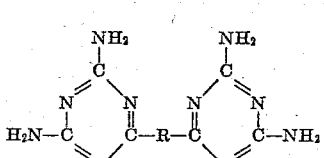

and monoguanamines obtained from the corresponding mononitriles containing as many as 18 carbon atoms, e. g., dodecano-, tetradecano-, or octadecano-nitrile.

A heterocyclic polyamine that has two triazine rings in its molecule may be a diguanamine having the general formula wherein R is a divalent hydrocarbon radical in which the shortest connection between the free valences is not more than eighteen carbon atoms in series and which contains no substituents or contains substituents such as aliphatic, cycloaliphatic, aromatic, alkoxy, aryloxy and acyl radicals, or may be a compound having said general formula that is substituted on not more than two exocyclic nitrogen atoms, the substituents consisting of (a) not more than two monovalent aliphatic hydrocarbon radicals on each substituted nitrogen atom, each having not more than four carbon atoms, each having at least one hydrogen atom attached to the same carbon atom as the free valence, and each having not more than one unsaturation, any such unsaturation being an olefinic unsaturation in the beta-gamma position, (b) not more than one monovalent radical of the benzene series on each substituted nitrogen atom having not more than eight carbon atoms in which the free valence is connected to the nucleus, and (c) not more than one mono-alkoxy phenyl radical on each substituted nitrogen atom having not more than eight carbon atoms. Thus the diguanamines used may have varying structures and may be of complex structure so long as they do not contain groups which interfere with the condensation reaction of formaldehyde with the diguanamine in the practice of the invention. Such diguanamines include:

Gamma-methyl-gamma-acetyl pimeloguanamine,

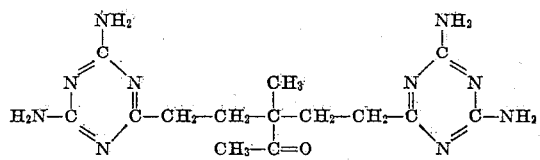

Sebacoguanamine,

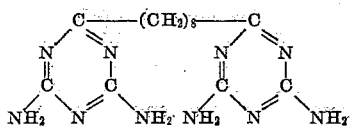

Adipoguanamine,

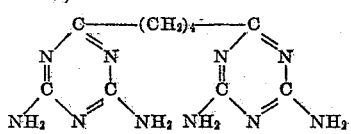

Bis-(4,6-diamino-2-triazinyl-ethyl) fluorene,

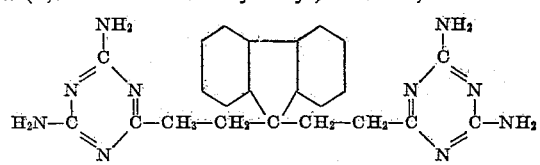

Gamma-isopropenyl-gamma-acetyl pimeloguanamine,

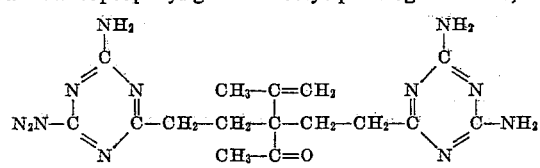

Sym.-diphenyladipoguanamine,

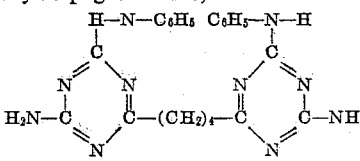

Phthaloguanamine,

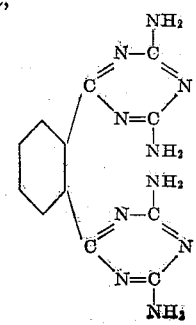

p,p'-Bis-2,4-diamino-6-triazinyl diphenyl,

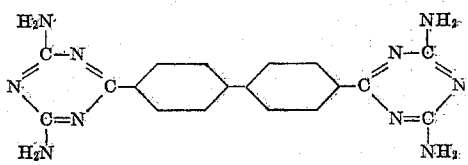

1,2-bis-2,4-diamino-6-triazinyl naphthalene,

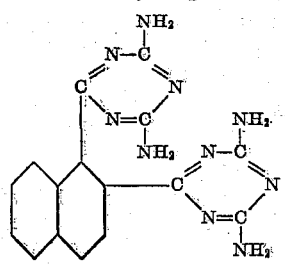

sym.-diphenylsebacoguanamine, sym.-di-p-phenetyladipoguanamine, sym.-di-o-tolyladipoguanamine, terephthaloguanamine and diguanamines obtained from nitriles such as 2,4-dicyanodiphenyl, 4,4'-dicyanodiphenyl methane, 4,4'-dicyanodiphenyl ethane, and 4,4'-dicyano-alpha, gamma-diphenyl propane.

A heterocyclic polyamine that has three triazine rings in its molecule may be a triguanamine such as gamma-2,4-diamino-6-triazinyl-gamma-phenylpimeloguanamine

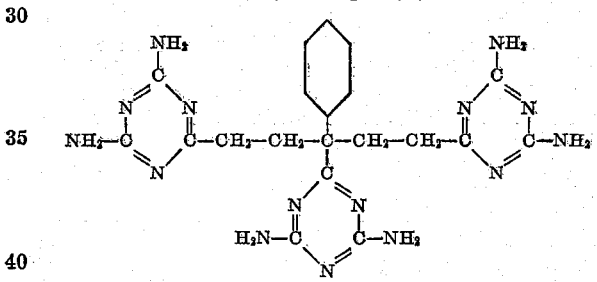

A thermosetting heterocyclic polyamine-formaldehyde reaction product may be obtained by reacting a heterocyclic polyamine, as hereinbefore defined (or a mixture of such amines), either with formaldehyde or with a polymer thereof, such as paraformaldehyde. When used for this reaction, paraformaldehyde is considered to split up so that the substance actually taking part in the reaction is formaldehyde. The heterocyclic polyamine may be reacted with a solution of formaldehyde in water, in an organic solvent such as alcohol, or in a liquid containing both water and an organic solvent. A water solution is usually preferred. The reaction may be performed in an autoclave, if desired, to secure a reaction temperature above the boiling point of the solvent. Ordinarily, the heterocyclic polyamine is added to a commercial aqueous formaldehyde solution having a pH of about 4, or to such a solution which has been made less acid, or neutral, or alkaline, preferably at a pH between 6 and 8, by addition of any desired base, such as sodium hydroxide, ammonium hydroxide, borax or triethanolamine.

In general, the proportion of formaldehyde actually reacting may range from one-half to a maximum of two molecules for each amino group. An excess of formaldehyde above this maximum may be used for the reaction if desired, although an uncombinable excess of one of the reactants usually is not desirable in the final product. Because of the complexity of the molecules of the reaction products that are produced, the proportion of formaldehyde actually reacting may vary freely between the limits stated. The preferred proportions vary, of course, with the specific substance that is reacted with formaldehyde. For example, when the substance is melamine, the preferred proportions are about 3 mols of formaldehyde for each mol of melamine. Other examples of preferred molar ratios of formaldehyde to a heterocyclic polyamine for the preparation of a resinous reaction product for the coating of kaolin particles in the practice of the invention are 2:1 for guanazole or 1-carbamyl guanazole, 4:1 for 2,4-diamino-6-hydroxy pyrimidine, 3:1 for 2,4-diamino quinazoline, 2:1 for formoguanamine, acetoguanamine or benzoguanamine and 5:1 for adipoguanamine or sebacoguanamine.

The reaction proceeds at normal temperatures, but heating ordinarily is desirable to shorten the time of reaction, or, in some cases, to dissolve the substance to be reacted with formaldehyde. The desired resin solution ordinarily is obtained by carrying the reaction only to its earliest stage, for example, the stage at which the reacting ingredients have just dissolved to form a solution, or for a few minutes thereafter.

When the reaction between formaldehyde and a heterocyclic polyamine is substantially complete, the solution of the reaction product is used to coat kaolin particles by the procedure hereinafter described. The preferred heterocyclic polyamine for use in the preparation of resin-coated kaolin particles is melamine.

In the preparation of resin-coated kaolin particles, the heterocyclic polyamine-formaldehyde reaction product solution is diluted with water or any suitable solvent so that the volume of the resin solution is such that it may be used to deposit only a very small amount of the resin as a coating on the kaolin, the extent of the dilution varying, of course, with the procedure employed for applying the resin to the kaolin, as is hereinafter further discussed. The dilution should be made carefully so that the resin does not precipitate as the water is added. It is desirable that before dilution the pH of the resin solution be adjusted (e. g., with dilute lactic acid) so that it is on the slightly acid side, to prevent precipitation of methylols upon dilution and to promote condensation of the resin that is employed.

When the reaction product has thoroughly coated the kaolin particles, it is desirable that the material be subjected to strong heating, since the heterocyclic polyamine-formaldehyde reaction product on the finished filler should be in a relatively advanced state of condensation. It is ordinarily desirable that the reaction product be in an infusible state, but at least the resin on the kaolin particles should be sufficiently condensed that neither water nor formaldehyde will be liberated during further processing operations in the preparation of a composition of the invention. Although the slightly acid pH of the coating solution may aid the cure initially, several hours of heating may be necessary at an elevated temperature to bring the resinous substance to a sufficiently advanced state of condensation (or to an infusible state in accordance with the preferred procedure). Any desired method may be used to coat the kaolin particles with the resin, so long as care is taken to avoid agglomeration of the kaolin particles. Of course, the preferred procedures are those which result in the least change in the physical characteristics of the kaolin particles. For example, the kaolin may be stirred into a highly dilute solution of the desired resin to form a slurry that can be readily atomized for spray drying to obtain finely-divided resin-coated kaolin particles, or the slurry can be vacuum drum-dried and ball-milled or hammer-milled to a finely pulverized form. Alternatively, a dilute resin solution may be absorbed on kaolin particles in a mixer and the resulting mass dried on trays at an elevated temperature (e. g., at about 160 degrees F.) before grinding it to the desired particle size by any known procedure.

The proportion of a heterocyclic polyamine-formaldehyde reaction product solution used to coat kaolin particles may vary with the specific reaction product employed as well as with the degree of improvement in properties that is desired. Ordinarily, it is preferred that approximately 2 to 30 percent of the final dry coated kaolin particles consist of the thermosetting heterocyclic polyamine-formaldehyde reaction product (preferably in its infusible state), and it is most desirable that from about 5 to about 15 percent of the final dry coated kaolin particles consist of the reaction product. (The terms "percent" and "parts" are used herein to mean percent and parts by weight unless otherwise specified.)

If the heterocyclic polyamine used is one that reacts so rapidly with formalin that the reaction product reaches the insoluble stage almost immediately after the reactants are mixed and heated (guanazole is an example of such a heterocyclic polyamine), it is preferable simply to mix the polyamine and the formalin at room temperature and then to add the water for dilution, and the acid for adjusting the pH. The relatively clear solution so obtained is mixed with the kaolin particles, which are then thoroughly dried in accordance with any of the procedures hereinbefore described. In this case, the reaction between the heterocyclic polyamine and the formaldehyde actually takes place on the kaolin particles during the drying operation.

It is preferable that resin-coated kaolin particles be the sole filler in a composition of the invention. However, the improvements imparted by resin-coated kaolin particles as a filler are so great that a combination of such resin-coated kaolin particles with other fillers such as asbestos, resin-coated asbestos and resin-treated cellulose may be used to obtain compositions which can be molded into articles having excellent resistance to hydrolysis and good strength characteristics. (Fillers such as asbestos and cellulose, as hereinbefore demonstrated, cannot be used alone as fillers in polyallyl ester compositions without serious impairment of the water resistance and strength of articles molded from the compositions.)

Although the term "asbestos" in commercial use has come to mean only the prevalent "Canadian asbestos," i. e., chrysotile (as the mineral occurring naturally and as the fibers resulting from processing the mineral), strictly speaking "asbestos" is a generic term applicable to silicate minerals having a fibrous structure. The term "asbestos" is used hereinafter in its more strict meaning, i. e., to include not only chrysotile fibers but also other silicate mineral fibers, which may be used as fillers in combination with resin-coated kaolin in compositions of the invention.

Silicate mineral fibers are obtained principally from two mineral families, viz. serpentines and pyroboles. Both families contain non-fibrous as well as fibrous members. The most important fibrous serpentine is chrysotile, $3MgO.2SiO_2.2H_2O$, a hydrous silicate of magnesium. The pyroboles that may be used as fillers are minerals consisting essentially of silicates of divalent metals, having the general composition: $MO.SiO_2$, wherein M is a divalent metal; but they may also contain small amounts of monovalent metals (e. g., sodium) and trivalent metals (e. g., aluminum or ferric iron). Examples of such pyroboles include:

Diopside, $(Ca,Mg)O.SiO_2$, essentially a silicate of calcium and magnesium
Wollastonite, $CaO.SiO_2$, a relatively pure silicate of calcium
Anthophyllite, $(Mg.Fe)O.SiO_2$, essentially a silicate of iron and magnesium, usually with a little aluminum
Tremolite, $3MgO.CaO.4SiO_2$, a relatively pure silicate of magnesium and calcium
Actinolite, $3(Mg,Fe)O.CaO.4SiO_2$, similar to tremolite, but containing at least 3 percent by weight of FeO; and
Others descriptively named mountain leather and mountain cork.

The pyroboles are further classified into two distinct classes or families, viz. amphiboles and pyroxenes. According to J. W. Mellor in "Inorganic and Theoretical Chemistry" (Longmans, Green and Co., 1925), volume VI, pages 390 and 391, diopside and wollastonite are pyroxenes; and anthophyllite, tremolite and actinolite are amphiboles. Fibrous pyroboles are available commercially in the form of the crude ore from the mine and in the form of fibers obtained by milling the ore (e. g., in a crusher) and then separating the fibers from the rock residue (e. g., by suction). Ordinarily, the fibers commercially available must be purified further for use as fillers, since such fibers usually contain a substantial amount of mineral impurities which affect deleteriously many of the properties of the hardened compositions. The necessity and extent of purification are determined by the nature of the impurities, their effect on the mechanical strength of molded articles and their damaging effect on the mold itself. Pyrobole fibers sufficiently purified for use as a filler may be obtained by carrying out a simple flotation process, e. g., by introducing water continuously into the bottom of a vessel equipped with an overflow and containing the pyrobole fibers, so that the impurities remain at the bottom of the vessel and the purified fibers float out with the overflowing water. If extreme purity of the fibers is required, tremolite fibers are preferred, since tremolite occurs naturally in a very pure state and often requires little or no further purification.

Fibrous pyroboles occur in various fiber lengths ranging up to as much as 7 inches, but the fiber lengths are reduced substantially in the ordinary milling process. No particular fiber length is required for pyrobole fibers used as fillers, and the section of the fiber length depends upon the desired properties and the intended use of the final product. For example, if the pyroble fibers are to be used as a filler in a molding compound, the fibers are ground down to the size of ordinary fibrous fillers for use in such compounds, i. e., the fiber lengths of groups No. 6 and No. 7 of the Canadian asbestos classification, at which the fibers appear to the naked eye to be similar in form to sawdust.

In general, a combination of resin-coated kaolin with chrysotile asbestos is preferred when asbestos is employed as a filler in the practice of the invention. If desired, the chrysotile asbestos may be heat treated as described in British Patent No. 569,183.

A mixture of resin-coated kaolin particles and resin-coated asbestos is also a desirable filler combination in a composition of the invention. The asbestos may be coated with a heterocyclic polyamine-formaldehyde reaction product by any of the procedures hereinbefore described for treating the kaolin particles, the proportion of the reaction product employed preferably being such that it comprises from about 2 to about 25 percent of the final coated asbestos filler, and most desirably about 5 to 15 percent of the final coated asbestos filler.

A mixture of resin-coated kaolin particles and resin-treated cellulose is also a desirable filler combination in a composition of the invention.

The term "cellulose" is used herein to include any form of cellulose filler, for example, alpha cellulose, shredded paper, chopped cloth (e. g., canvas), cotton flock, cotton linters, purified wood fibers in finely ground forms or in felted-fiber forms, cotton cord or regenerated cellulose. Resin-treated cellulose (i. e., cellulose which has been impregnated with a thermosetting heterocyclic-polyamine formaldehyde reaction product converted to its infusible state on the cellulose) is prepared by a procedure similar to that described for the preparation or resin-coated kaolin particles. A dilute heterocyclic polyamine-formaldehyde reaction product solution is prepared as hereinbefore described, the weight of the dilute solution being from two to three times the weight of the cellulose to be treated. (The weight of the cellulose is always taken as its bone dry weight. The cellulose employed need not be bone dry, of course, so long as its water content is accounted for in calculating its weight.)

When the reaction product has thoroughly impregnated the cellulose filler, it is essential that the material be thoroughly dried and that the resinous reaction product be cured on the filler to the infusible state, as hereinbefore described. The completeness of cure may be checked from time to time during the curing operation by boiling a sample of the treated filler in water. If the cure is still incomplete, a cloudy solution will result because of dissolved resinous reaction product. On the other hand, if the solution is clear, complete cure is indicated.

The proportion of a heterocyclic polyamine-formaldehyde reaction product solution used to impregnate a cellulose filler should be such that from 2.5 to 40 percent of the final treated dry filler consists of the heterocyclic polyamine-formaldehyde reaction product in its infusible state. It is preferred that the proportion of the reaction product solution be such that from about 14 to 25 percent of the final treated filler consists of the reaction product in its infusible state.

*Catalysts*

As hereinbefore stated, it is preferable that the polyallyl ester which is used as a binder in a composition of the invention be in partially polymerized form. Usually a solution of the partially polymerized polyallyl ester in acetone or another solvent is used, and the solvent is removed during the production of a molding composition. If a peroxide catalyst is added to the solution before the solvent is removed, the partially polymerized resin can be further polymerized by heating to the desired degree of cure.

The preferred catalyst for use in the production of a composition of the invention is t-butyl perbenzoate, but any other organic peroxide (not containing polymerization-inhibiting radicals), such as succinyl peroxide, benzoyl peroxide, di-t-butyl perphthalate, acetyl peroxide, peracetic acid, perbenzoic acid, toluoyl peroxide, p-bromobenzoyl peroxide, anisoyl peroxide, chloroacetyl peroxide, acetyl benzoyl peroxide, diacetyl peroxide and furoyl peroxide; or any organic ozonide (not containing polymerization-inhibiting radicals), such as di-isopropylene ozonide or di-isobutylene ozonide, or a mixture of such substances, may be used as the curing catalyst.

*Production of polymerizable composition*

The polymerizable compositions of the invention include molding, casting and adhesive compositions.

In the production of a molding composition of the invention, it is preferable that a polymerizable polyallyl ester such as a diallyl ester first be partially polymerized to a soluble addition-type polymer, as hereinbefore described. A solution of this polymer in acetone or other solvent is then mixed with the filler, catalyst and other ingredients of the composition in a dough or sigma-bladed mixer. The solvent is removed by drying, e. g., at temperatures around 140 degrees F. for several hours, or by venting of the vapors followed by passage of warm air over the mixture for about one-half hour. The resin cure is then advanced to the point where the composition offers sufficient resistance to flow in the mold to have satisfactory molding properties, e. g., by mixing for ten minutes on differential rolls or for a few minutes on a heated roll mill. Care should be taken not to advance the polymerization too far during the mixing operation, or the product may be stiff or even unmoldable.

The proportion of resin-coated kaolin particles used as a filler in a polymerizable polyallyl ester composition embodying the invention may range from the minimum amount capable of appreciably improving the physical properties of the hardened product (i. e., about 5 percent of the composition) to the maximum proportion which may be held together or bound satisfactorily by the polyallyl ester binder (i. e., about 85 percent of the composition). In general, the preferred amount of coated kaolin filler in a molding composition of the invention is from about 55 percent to about 70 percent of the composition, and the optimum results are obtained in the upper portion of such range.

A resin-treated cellulose filler, when used in combination with resin-coated kaolin particles in a composition of the invention, may be in a proportion as high as 1 part for every 2 parts of resin-coated kaolin particles, the total filler content being within the range specified for use when coated kaolin is the sole filler.

An asbestos filler, when used in combination with resin-coated kaolin particles in a composition of the invention, may be in a proportion that is as high as 1 part for each part of coated kaolin, the total filler content being within the range specified for use when coated kaolin is the sole filler.

The proportion of curing catalyst used in the practice of the invention is simply the proportion that causes the composition to polymerize at the desired rate, and as the term "catalyst" implies, such proportion is the usual catalytic amount, i. e., ranging from about 0.5 percent to about 1 or 2 percent of the composition. The preferred proportion of curing catalyst varies with different catalysts, and the amount of any particular curing catalyst required to produce a given rate of hardening may vary also with variations in the nature of the polymerizable composition.

In the production of a molding composition or a casting composition, plasticizers, lubricants, pigments and other coloring matter may be incorporated if desired.

The following example illustrates the practice of the invention.

EXAMPLE

A composition of the invention is prepared as follows:

A solution of a partially polymerized polyallyl ester (2450 grams consisting of 50 percent of acetone solvent, and 50 percent of diallyl phthalate of which 95 percent is in the form of a soft, solid fusible polymer melting in the range from 210 to 220 degrees F.) is mixed in a Hobart mixer with a catalyst (49 gram of t-butyl perbenzoate), resin-coated kaolin particles (1400 grams), anthophyllite fibers (700 grams), zinc oxide (175 grams) and zinc stearate (70 grams). (The resin-coated kaolin particles are prepared by the procedure hereinbefore described for the preparation of composition A of the invention.) The mixing is continued until a homogeneous material is obtained, which material is then dried at 140 degrees F. for three hours to remove the excess of acetone solvent. The material is then milled on differential rolls for about ten minutes. The resulting sheet is cooled and then granulated in a high speed cutter. The granular composition, hereinafter referred to as composition B, is molded and tested by the procedures hereinbefore described, the results being tabulated in Table 4 below.

For the sake of comparison, the results obtained on articles molded from two control compositions are also included in Table 4. Control (a) is prepared by the procedure described for composition B, except that the filler consists only of anthophyllite fibers (2400 grams) and the proportions of the other ingredients are as follows: 3200 grams of the solution of partially polymerized diallyl phthalate; 64 grams of t-butyl perbenzoate; and 80 grams of zinc stearate.

Control (b) is prepared by the procedure described for control (a), except that the filler consists of resin-coated anthophyllite fibers (2400 grams). (The resin-coated anthophyllite fibers are prepared as follows: A reaction mixture of a heterocyclic polyamine (109 grams of melamine), formalin (210 grams) and water (400 grams) is heated to a temperature of 80 degrees C. As soon as a clear solution is obtained, the pH is adjusted to 6.7 by adding lactic acid (0.7 cc. of a 10 percent solution), and the heating is continued for a total time of ten minutes. The resin solution is then cooled to 60 degrees C. and diluted with water (3200 grams). The resulting dilute solution is absorbed on anthophyllite fibers (1638 grams) in a Hobart mixer, and the resulting treated fibers are dried on trays at 160 degrees F. for approximately 48 hours.)

TABLE 4

| | Composition | | |
|---|---|---|---|
| | B | control (a) | control (b) |
| Boiling water Abs. 1 hr | .015 | .030 | .015 |
| Cold water Abs. 24 hrs | .005 | .010 | .010 |
| Cold water Abs. 48 hrs | .010 | .015 | .015 |
| Cold water Abs. 7 days | .020 | .020 | .020 |
| Insulation resistance (meg.): | | | |
| 7 days | 183,000 | 23,000 | 19,500 |
| 14 days | 200,000 | 9,000 | 35,000 |
| 21 days | 205,000 | 5,000 | 29,000 |
| 28 days | 161,000 | 3,800 | 12,500 |
| Flexural (p. s. i.) | 6,180 | 4,490 | 4,660 |
| Compressive (p. s. i.) | 18,000 | 9,850 | 12,500 |
| Flexural modulus $10^6$ | 1.61 | 1.68 | 1.52 |

Having described the invention, I claim:

1. A material which, upon polymerization, has improved water resistance and electrical properties, comprising (a), as a binder, partially polymerized diallyl phthalate, and (b), as filler, kaolin particles coated with a thermosetting reaction product of formaldehyde and a substance whose molecule has a plurality of $NH_2$ groups each connected to a carbon atom contained in a heterocyclic ring, the ring consisting of from five to six carbon and nitrogen atoms of which not more than three are nitrogen atoms, and the carbon atom being connected by a double bond to an intracyclic nitrogen atom, said partially polymerized diallyl phthalate being not less than 65% of the binder.

2. A material as claimed in claim 1 wherein the substance whose molecule has a plurality of $NH_2$ groups, is melamine.

3. A material as claimed in claim 1 that includes asbestos in addition to the coated kaolin.

4. A material as claimed in claim 3 wherein the substance whose molecule has a plurality of $NH_2$ groups, is melamine.

References Cited in the file of this patent

UNITED STATES PATENTS

| 2,642,409 | Cordier | June 16, 1953 |
| 2,680,722 | Anderson | June 8, 1954 |